US010680817B2

(12) United States Patent
Sugitani

(10) Patent No.: US 10,680,817 B2
(45) Date of Patent: Jun. 9, 2020

(54) WIRELESS COMMUNICATIONS DEVICE AND CONTROL METHOD FOR WIRELESS COMMUNICATIONS DEVICE

(71) Applicant: Panasonic Intellectual Property Management Co., Ltd., Osaka (JP)

(72) Inventor: Toshiyuki Sugitani, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 255 days.

(21) Appl. No.: 15/127,963

(22) PCT Filed: Mar. 30, 2015

(86) PCT No.: PCT/JP2015/001822
§ 371 (c)(1),
(2) Date: Sep. 21, 2016

(87) PCT Pub. No.: WO2015/151496
PCT Pub. Date: Oct. 8, 2015

(65) Prior Publication Data
US 2017/0111173 A1   Apr. 20, 2017

(30) Foreign Application Priority Data
Apr. 2, 2014   (JP) .................................. 2014-075917

(51) Int. Cl.
*H04L 29/06*      (2006.01)
*H04L 9/16*       (2006.01)
(Continued)

(52) U.S. Cl.
CPC .............. *H04L 9/16* (2013.01); *H04L 9/0891* (2013.01); *H04W 12/04* (2013.01);
(Continued)

(58) Field of Classification Search
CPC ........................... H04L 9/0891; H04L 63/068
See application file for complete search history.

(56) References Cited

U.S. PATENT DOCUMENTS 5,485,462 A * 1/1996 Helm .................... G10L 19/135
370/332
5,925,146 A * 7/1999 Murata ................ H04B 14/068
714/746

(Continued)

FOREIGN PATENT DOCUMENTS

EP    0 856 960 A1    8/1998
JP    2008-294990 A  12/2008

OTHER PUBLICATIONS

Schurmann et al., "Secure Communication Based on Ambient Audio", IEEE Transactions on Mobile Computing, vol. 12, Issue: 2, (Year: 2013).*

(Continued)

*Primary Examiner* — Morshed Mehedi
(74) *Attorney, Agent, or Firm* — Seed IP Law Group LLP

(57) ABSTRACT

A wireless communications device is constituted from a control station and a slave station that perform encryption communication using an encryption key and changes the encryption key in a predetermined procedure, during a call, and the device includes a controller that operates in such a manner that audio is reduced, if the procedure in which the encryption key is changed is not correctly executed, in a case where a change of the encryption key is made.

10 Claims, 7 Drawing Sheets

(51) Int. Cl.
*H04W 12/04* (2009.01)
*H04L 9/08* (2006.01)
*H04W 12/02* (2009.01)

(52) U.S. Cl.
CPC ........ *H04L 63/068* (2013.01); *H04L 2209/80* (2013.01); *H04W 12/02* (2013.01)

(56) References Cited

U.S. PATENT DOCUMENTS

| | | | | |
|---|---|---|---|---|
| 6,285,891 | B1* | 9/2001 | Hoshino | H04M 1/72569 455/550.1 |
| 7,768,978 | B2* | 8/2010 | Numakura | H04L 69/14 370/333 |
| 7,822,688 | B2* | 10/2010 | Labrou | G06Q 20/02 705/67 |
| 2004/0044824 | A1* | 3/2004 | Haneda | G10L 19/00 711/1 |
| 2004/0158704 | A1* | 8/2004 | Oates | H04L 63/0428 713/151 |
| 2007/0255702 | A1* | 11/2007 | Orme | G06F 16/338 |
| 2008/0320375 | A1* | 12/2008 | Hori | H04L 1/0061 714/807 |
| 2010/0146091 | A1* | 6/2010 | Curtis | G06F 15/173 709/223 |

OTHER PUBLICATIONS

Lagendijk et al., "Encrypted signal processing for privacy protection: Conveying the utility of homomorphic encryption and multi-party computation", IEEE Signal Processing Magazine, vol. 30, Issue: 1, Jan. (Year: 2012).*

Extended European Search Report, dated Dec. 19, 2016, for corresponding EP Application No. 15772746.2-1870, 9 pages.

Communication pursuant to Article 94(3) EPC, dated Mar. 1, 2018, for the related European Patent Application No. 15 772 746.2-1218, 4 pages.

European Telecommunications Standards Institute, "Digital Enhanced Cordless Telecommunications (DECT); Generic Access Profile (GAP)," ETSI EN 300 444 V2.2.6, Sophia Antipolis Cedex, France, Dec. 2011, 154 pages.

ETSI EN 300 175-2 V1.9.1, "Digital Enhanced Cordless Telecommunications (DECT); Common Interface (CI); Part 2: Physical Layer (PHL)," Sep. 2005, 64 pages.

ETSI EN 300 175-3 V1.9.1, "Digital Enhanced Cordless Telecommunication (DECT); Common Interface (CI); Part 3: Medium Access Control (MAC) layer," Sep. 2005, 235 pages.

ETSI EN 300 175-5 V1.9.1, "Digital Enhanced Cordless Telecommunication (DECT); Common Interface (CI); Part 5: Network (NWK) layer," Sep. 2005, 309 pages.

ETSI EN 300 175-7 V2.4.0, "Digital Cordless Telecommunication (DECT); Common Interface (CI); Part 7: Security features," Dec. 2011, 142 pages.

ETSI EN 300 444 V2.2.6, "Digital Enhanced Cordless Telecommunication (DECT); Generic Access Profile (GAP)," Dec. 2011, 154 pages.

International Search Report dated May 19, 2015, for corresponding International Application No. PCT/JP2015/001822, 4 pages.

Digital Enhanced Cordless Telecommunications (DECT); Common Interface (CI); Part 5: Network (NWK) layer, Final draft ETSI EN 300 175-5 V2.4.0, Dec. 2011, pp. 234-236,[retrieved on Apr. 24, 2015]. Retrieved from the Internet<URL:http://www.etsi.org/deliver/etsi_en/300100_300199/30017505/02.04.00_40/en_30017505v020400o.pdf>.

* cited by examiner

WIRELESS COMMUNICATIONS DEVICE AND CONTROL METHOD FOR WIRELESS COMMUNICATIONS DEVICE

TECHNICAL FIELD

The present invention relates to a wireless communications device that is capable of being used as a cordless telephone or the like, and a control method for the wireless communications device.

BACKGROUND ART

In order to improve security performance, a technology in which encryption is performed for transmission and reception of control data for negotiation for establishing a communication path or of audio data that is to be transmitted and received during a call and thus communication is performed is used in wireless communication that is used for a cordless telephone or the like. In the wireless communication such as in the cordless telephone, a common key encryption schemes that use the same key for encryption and decoding are widely employed. In order to improve convenience, a key that is used in the common key encryption scheme is automatically generated using wireless communication, and the generated key is stored in a non-volatile memory of each of the master and slave devices, such as an EEPROM and is used for encryption communication, in the wireless communications device, such as a cordless telephone, that is used by an ordinary person. For example, encryption specifications, which are used for wireless communication in compliance with Digital Enhanced Cordless Telecommunications (DECT) schemes that are in wide use around the world as communication schemes for a digital cordless telephone, are stipulated in NPL 1, NPL 2, NPL 3, and NPL 4, and NPL 5. In NPL 5, a procedure and the like in a case where audio communication such as a cordless telephone is performed using a master device and a slave device that perform communication with the DECT scheme is stipulated, and an early-encryption method in which the encryption communication is activated immediately after a wireless link is established between the master device and the slave device and a Re-keying during a call method in which the encryption communication continues while changing a key for the encryption communication at suitable intervals are stipulated.

CITATION LIST

Non-Patent Literature

NPL 1: ETSI EN 300 175-2: "Digital Enhanced Cordless Telecommunications (DECT); Common Interface (CI); Part 2: Physical Layer (PHL)"

NPL 2: ETSI EN 300 175-3: "Digital Enhanced Cordless Telecommunications (DECT); Common Interface (CI); Part 3: Medium Access Control (MAC) layer"

NPL 3: ETSI EN 300 175-5: "Digital Enhanced Cordless Telecommunications (DECT); Common Interface (CI); Part 5: Network (NWK) layer"

NPL 4: ETSI EN 300 175-7: "Digital Enhanced Cordless Telecommunications (DECT); Common Interface (CI); Part 7: Security features"

NPL 5: ETSI EN 300 444: "Digital Enhanced Cordless Telecommunications (DECT); Generic Access Profile (GAP)"

SUMMARY OF THE INVENTION

Solution to Problem

According to an aspect of the present invention, there is provided a wireless communications device that is constituted from a control station and a slave station that perform encryption communication using an encryption key and that changes the encryption key in a predetermined procedure, during a call, the device being constituted to include a controller that operates in such a manner that audio is reduced, if the procedure in which the encryption key is changed is not correctly executed, in a case where a change of the encryption key is made.

DESCRIPTION OF EMBODIMENTS

Embodiments of the present invention will be described below.
(First Exemplary Embodiment)
[Constitution of a Cordless Telephone]

Figure 1:
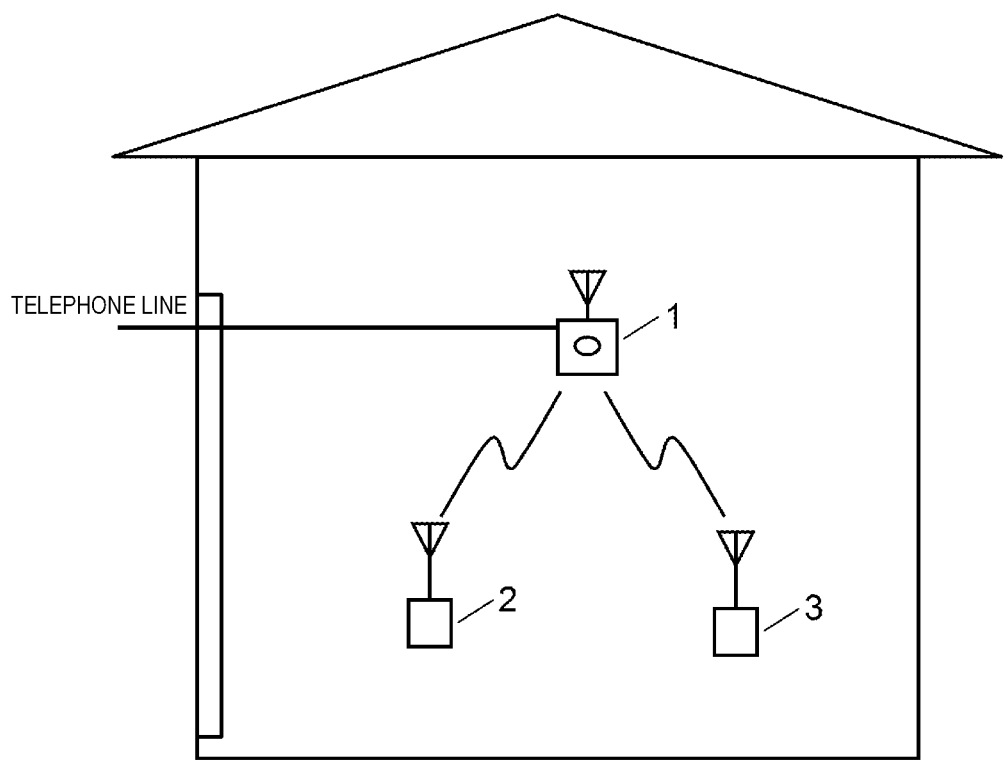
FIG. 1 is a diagram illustrating an example of a cordless telephone for which a wireless communications device according to a first exemplary embodiment of the present invention is used.

An example of a constitution of a wireless communications device according to a first exemplary embodiment is described. FIG. 1 is a diagram illustrating an example of a cordless telephone for which the wireless communications device according to the present exemplary embodiment is used.

The cordless telephone for which the wireless communications device according to the present invention is used, which is illustrated in FIG. 1, is an example of a cordless telephone that is constituted from master device 1 and slave devices 2 and 3. Master device 1 is connected to a telephone line. Master device 1 as a control station and slave devices 2 and 3 as slave stations, for example, may be able to perform wireless communication in compliance with a DECT scheme, and slave devices 2 and 3 may be able to carry out an external-line call or an internal-line call through master device 1.
[Constitution of a Master Device]

Figure 2:
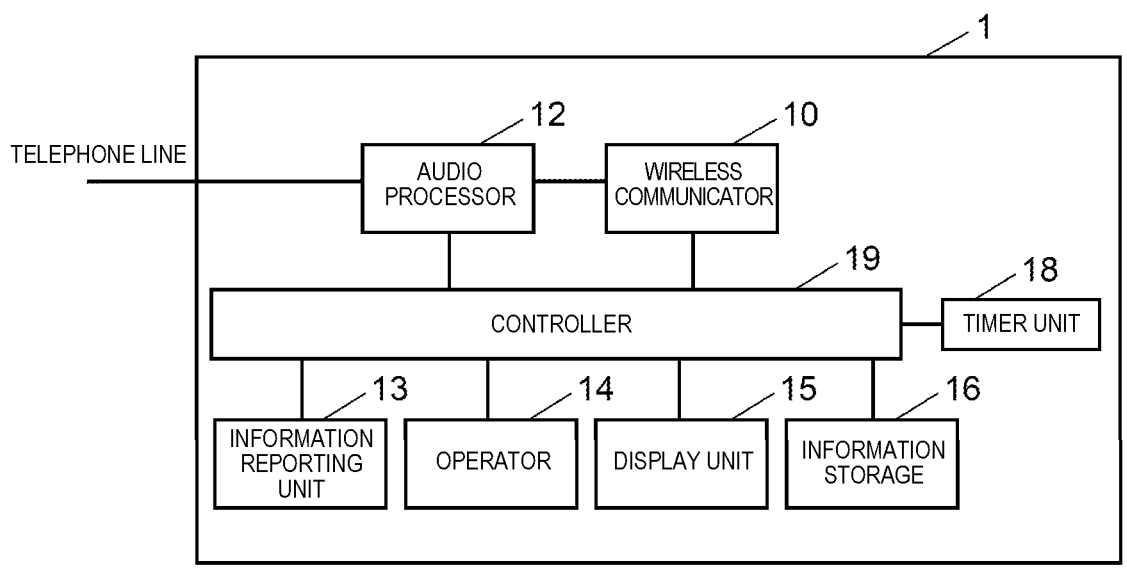
FIG. 2 is a block diagram illustrating an example of a constitution of a master device according to the first exemplary embodiment of the present invention.

An example of a constitution of a master device is described. FIG. 2 is a block diagram illustrating an example of the constitution of master device 1.

In FIG. 2, master device 1 has wireless communicator 10, audio processor 12, information reporting unit 13, operator 14, display unit 15, information storage 16, timer unit 18, and controller 19.

Wireless communicator 10 performs transmission and reception of control data or audio data for establishment of a wireless link or the external-line call, using a prescribed scheme, and in the case of encryption communication, performs encryption of transmission data and decoding of reception data. In the present specification, the "wireless communication" is assumed to include wireless transmission and wireless reception.

Audio processor 12 converts into a digital signal an audio signal that is input from a telephone line or a microphone (not illustrated), generates audio data for transmission, converts the received audio data into an analog signal, and outputs the resulting analog signal to the telephone line or a speaker (not illustrated). When a reception error occurs, and when a sequence error is detected at the time of changing an encryption key, an amount of audio output is reduced and the frequency of occurrence of noise is decreased.

Information reporting unit 13 receives an incoming call from the external line or is called up from slave devices 2 and 3 through an internal line, and outputs information reporting sound. An example of the information reporting sound, ringer sound is given.

Operation unit 14 is a button for receiving a user operation. Examples of the user operation, an operation (an outgoing-call operation) of placing a call, an operation of receiving a call (an incoming-call operation), an operation (slave device registration operation) of performing registration of a slave device, and the like are given.

Information on a user is displayed on display unit 15. As example of the information, a telephone number, registration information, an operation menu for slave devices 2 and 3, and the like are given.

An identification code (which is hereinafter referred to as an ID of the master device) of master device 1 and information on the slave device that is registered with master device 1 are stored in information storage 16. Information storage 16 is constituted as a non-volatile memory such as an EEPROM. Pieces of information on the slave device that is stored in information storage 16 are an identification code (which is hereinafter referred to as an ID of the slave device) and an authentication key for identifying and authenticating the registered slave device, and an encryption key that is used for the encryption communication.

Timer unit 18 measures an interval at which the encryption key changes, and a time, such as an interval for retrying changing the encryption key.

Control unit 19 controls operation of entire master device 1 in cooperation with each unit described above. Control by control unit 19 will be described below. Master device 1, for example, has a Central Processing Unit (CPU), a storage medium, such as a Read Only Memory (ROM) in which a control program is stored, and a memory for operation, such as a Random Access Memory (RAM). In this case, a function of control unit 19 is realized by the CPU executing the control program.

Figure 3:
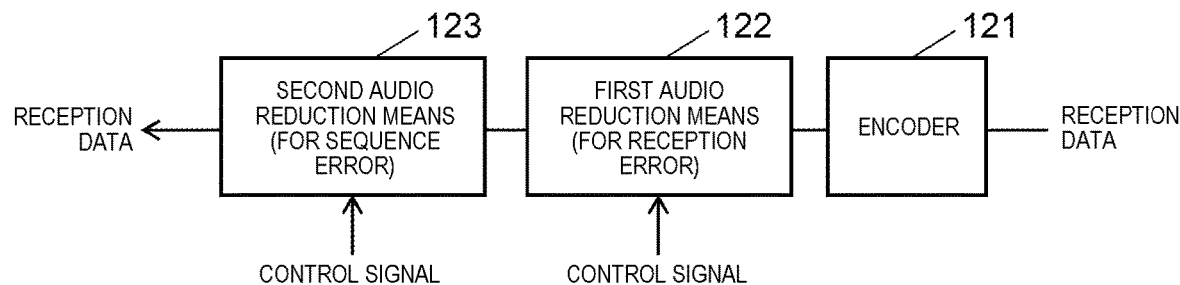
FIG. 3 is a block diagram illustrating an example of a constitution of a reception processor of an audio processor of the master device according to the first exemplary embodiment of the present invention.

Next, an example of a constitution of a reception processor of audio processor 12 of master device 1 is described. FIG. 3 is a block diagram illustrating an example of a constitution of the reception processor of audio processor 12 of master device 1.

In FIG. 3, the reception processor of audio processor 12 of master device 1 has decoder 121, first audio reduction means 122, and second audio reduction means 123.

Decoder 121 performs decoding of audio data that is sent in a state of being compressed, and outputs data in compliance with linear PCM. For example, in the case of the wireless communication in compliance with the DECT scheme, the G.726 audio coding scheme is employed as an audio coding scheme, pieces of audio data that are sampled at 8 kHz are compressed into 4 bit data, and the resulting 4-bit data is transmitted and received. A G.726 decoder that is provided to the reception side restores the 4-bit compressed data to the 8-bit data in compliance with the linear PCM.

First audio reduction means 122 performs audio data reduction according to a control signal from controller 19, which notifies a state of occurrence of a reception error. When the occurrence of the reception error is notified by controller 19, first audio reduction means 122 operates in such a manner that an audio output level is lowered to the degree to which the audio is gradually faded out. For example, in the case of the wireless communication in compliance with the DECT scheme, communication that uses a time division multiplexing scheme in which a frame periodicity is 10 msec is performed, and an audio signal with a periodicity of 10 msec is transmitted and received in a state where a code for detection of the reception error is attached to the audio signal itself. In this case, whenever the reception error is detected, first audio reduction means 122 operates in such a manner that the audio is faded out by 3 db at a time with the periodicity of 10 msec, and when the reception error does not occur, operates in such a manner that the audio is faded in at the periodicity of 10 msec to a stipulated value (maximum value).

Second audio reduction means 123 performs the audio data reduction according to a control signal from controller 19, which notifies a state of occurrence of a sequence error. When the occurrence of the sequence error is notified by controller 19, second audio reduction means 123 performs control in such a manner that the audio output level is lowered to the degree to which the audio is muted, and when the sequence error does not occur, operates in such a manner that the muting is cancelled or the audio is faded out at the periodicity of 10 msec to the stipulated vale (maximum value).

Functional units that are included in master device 1 is not limited to the functional units whose reference numbers are 10 to 19 and which are illustrated in FIG. 2 and the functional units whose reference numbers are 121 to 123 and which are illustrated in FIG. 3, and other functional units may be included. Other functional units may be functional units that realize main functions of master device 1, and may be functional units that realize auxiliary functions that assist the main functions.

[Constitution of the Slave Device]

Figure 4:
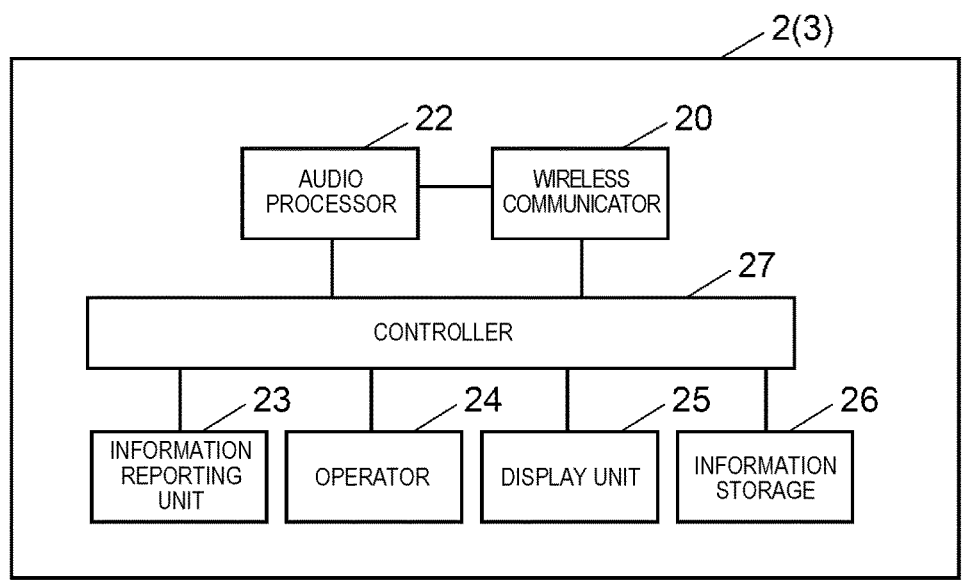
FIG. 4 is a block diagram illustrating an example of a constitution of a slave device according to the first exemplary embodiment of the present invention.

An example of a constitution of the slave device is described. FIG. 4 is a block diagram illustrating an example of the constitution of slave device 2. Because a constitution of slave device 3 is the same as that of slave device 2, a description relating to slave device 3 is omitted.

In FIG. 4, slave device 2 has wireless communicator 20, audio processor 22, information reporting unit 23, operator 24, display unit 25, information storage 26, and controller 27.

Wireless communication unit 20 performs transmission and reception of control data or audio data for establishment of a wireless link or the external-line call, using a prescribed scheme, and in the case of encryption communication, performs encryption of transmission data and decoding of reception data.

Audio processing unit 22 converts into a digital signal an audio signal that is input from a microphone (not illustrated), generates audio data for transmission, converts the received audio data into an analog signal, and outputs the resulting analog signal to a speaker (not illustrated). When a reception error occurs, and when a sequence error occurs at the time of changing an encryption key, an amount of reception audio output is reduced and the frequency of occurrence of noise is decreased.

Information reporting unit 23 receives the incoming call from the external line or is called up from master device 1 and slave device 3 through the internal line, and outputs the information reporting sound. An example of the information reporting sound, the ringer sound is given.

Operation unit 24 is a button for receiving the user operation.

Examples of the user operation, the operation (an outgoing-call operation) of placing a call, the operation of receiving a call (an incoming-call operation), the operation (slave device registration operation) of performing registration of a slave device, and the like are given.

Information on the user is displayed on display unit 25. As example of the information, a telephone number, an operation menu for slave device 2, and the like are given.

Included in information storage 26 are a slave ID of slave device 2, a master ID and an authentication key of the registered master device, that is, master device 1, and an encryption key that is used for the encryption communication. Information storage 16 is constituted as a non-volatile memory such as an EEPROM.

Control unit 27 controls operation of entire slave device 2 in cooperation with each unit described above. Control by control unit 27 will be described below. Slave device 2, for example, has a CPU, a storage medium, such as a ROM in which the control program is stored, and a memory for operation, such as a RAM. In this case, a function of control unit 27 is realized by the CPU executing the control program.

Figure 5:
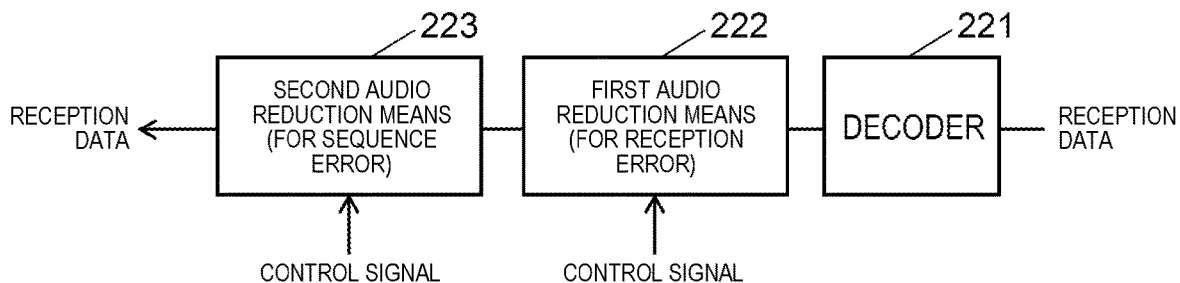
FIG. 5 is a block diagram illustrating an example of a constitution of a reception processor of an audio processor of the slave device according to the first exemplary embodiment of the present invention.

Next, an example of a constitution of a reception processor of audio processor 22 of slave device 2 is described. FIG. 5 is a block diagram illustrating an example of a constitution of the reception processor of audio processor 22 of slave device 2.

In FIG. 5, the reception processor of audio processor 22 of slave device 2 has decoder 221, first audio reduction means 222, and second audio reduction means 223.

Decoder 221 performs decoding of audio data that is sent in a state of being compressed, and outputs data in compliance with the linear PCM. For example, in the case of the wireless communication in compliance with the DECT scheme, the G.726 audio coding scheme is employed as an audio coding scheme, pieces of audio data that are sampled at 8 kHz are compressed into 4 bit data, and the resulting 4-bit data is transmitted and received. The G.726 decoder that is provided to the reception side restores the 4-bit compressed data to the 8-bit data in compliance with the linear PCM.

First audio reduction means 222 performs the audio data reduction according to a control signal from controller 27, which notifies a state of occurrence of a reception error. When the occurrence of the reception error is notified by controller 19, first audio reduction means 222 operates in such a manner that an audio output level is lowered to the degree to which the audio is gradually faded out. For example, in the case of the wireless communication in compliance with the DECT scheme, communication that uses a time division multiplexing scheme in which a frame periodicity is 10 msec is performed, and an audio signal with a periodicity of 10 msec is transmitted and received in a state where a code for detection of the reception error is attached to the audio signal itself. In this case, whenever the reception error is detected, first audio reduction means 122 operates in such a manner that the audio is faded out by 3 db at a time with the periodicity of 10 msec, and when the reception error does not occur, operates in such a manner that the audio is faded in at the periodicity of 10 msec to a stipulated value (maximum value).

Second audio reduction means 223 performs the audio data reduction according to a control signal from controller 27, which notifies a state of occurrence of a sequence error. When the occurrence of the sequence error is notified by controller 19, second audio reduction means 223 performs control in such a manner that the audio output level is lowered to the degree to which the audio is muted or in such a manner that the audio is steeply faded out, and when the sequence error does not occur, operates in such a manner that the muting is cancelled or the audio is faded in at the periodicity of 10 msec to the stipulated value (maximum value).

Functional units that are included in slave device 2 is not limited to the functional units whose reference numbers are 20 to 27 and which are illustrated in FIG. 4 and the functional units whose reference numbers are 221 to 223 and which are illustrated in FIG. 5, and other functional units may be included. Other functional units may be functional units that realize main functions of slave device 2, and may be functional units that realize auxiliary functions that assist the main functions.

[Operation of Each of Master Device 1 and Slave Device 2]

An example of operation of the cordless telephone that uses the wireless communications device according to the present invention, which is described above, will be described below.

Figure 6:
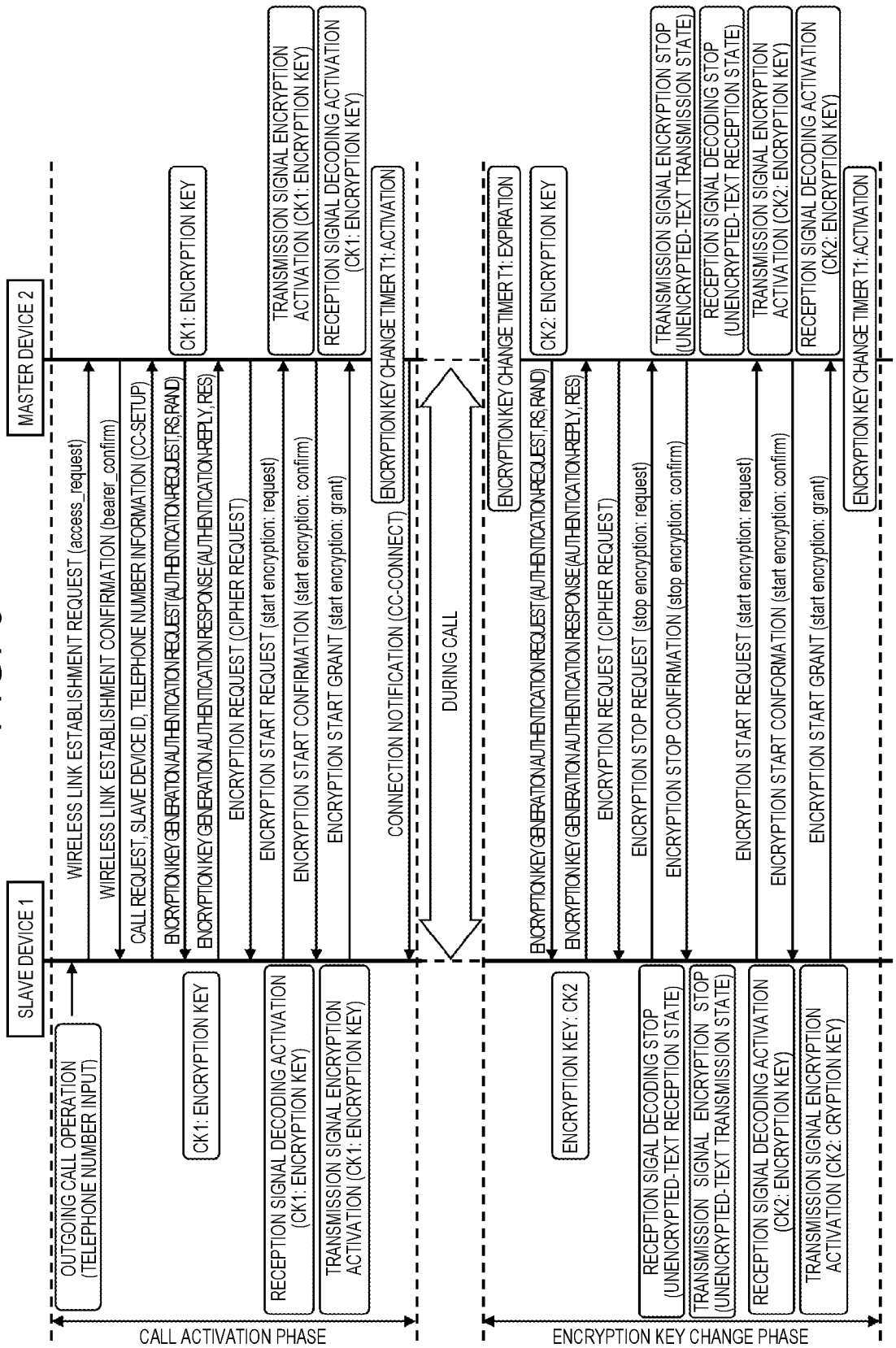
FIG. 6 is a diagram illustrating an example of a signal that is transmitted and received in wireless communication and an operation between the master device and the slave device from when placing a call to when the call is in progress, according to the first exemplary embodiment of the present invention.

FIG. 6 is a diagram illustrating an example of a signal that is transmitted and received in wireless communication and an operation between the master device and the slave device from when placing a call to when the call is in progress. In FIG. 6, a call activation phase is a phase for establishing a wireless link between master device 1 and slave device 2, notifying telephone number information and the like of a connection destination, and establishing a path for communication with the other party that is a call destination. When the call activation phase is completed, a telephone line that is connected to audio processor 12 of master device 1 and a microphone and a speaker (which are not illustrated) that are connected to audio processor 22 of slave device 2 are connected to each other through the wireless communication, and are in a state where the communication is in progress. The other communication party sends a reply, a state in which it is possible to place a call is attained. The encryption key change phase is a phase in which an encryption key is reissued during the communication to change the existing encryption key.

First, the call activation phase will be described in detail below. When an operation in which a telephone number of the other party is designated and an outgoing call is requested is performed in operator 24 in slave device 2, controller 27 starts an outgoing call operation, and the call activation phase is started. In the call activation phase, a wireless link establishment request (for example, access_request that is a control message of a MAC layer, in the case of the wireless communication in compliance with the DECT scheme) is transmitted by slave device 2, master device 1 replies with a wireless link establishment confirmation (for example, bearer_confirm that is a control message of the MAC layer, in the case of the wireless communication in compliance with the DECT scheme), and thus the wireless link between the master device and the slave device is established.

Subsequently, slave device 2 transmits a call request (for example, CC-SETUP that is a control message of an NWK layer, in the case of the wireless communication in compliance with the DECT scheme) that includes the slave device ID for identifying slave device 2, information of the telephone number of the other communication party, and the like.

Master device 1 that receives the call request transmits a message (for example, {AUTHENTICATION-REQUEST} that is a message of the NWK layer, in the case of the wireless communication in compliance with the DECT scheme) for an encryption key generation authentication request, and slave device 2 transmits an encryption key generation authentication reply (for example, {AUTHENTICATION-REPLY}) that is a message of the NWK layer, in the case of the wireless communication in compliance with the DECT scheme. With the encryption key generation authentication request, random numbers (for example, RS and RAND, in the case of the wireless communication in compliance with the DECT scheme) that are generated by master device 1 are transmitted, and with the encryption key generation authentication reply, an authentication reply value (for example, RES in the case of the wireless communication in compliance with the DECT scheme) that is generated in the slave device is transmitted. With the transmission and reception of the encryption key generation authentication request and the encryption key generation authentication reply, master device 1 performs authentication of whether or not the slave device that is the other communication party is slave device 2 that is registered with master device 1 itself, and at the same time, encryption key CK1 for encryption communication is generated in both of master device 1 and slave device 2. The authentication and the generation of the encryption key are performed by carrying out an arithmetic operation (which is hereinafter expressed as an authentication encryption key generation arithmetic operation) that is determined in advance by using the random numbers that are transmitted and received with the encryption key generation authentication request, the authentication reply value that is transmitted and received with the encryption key generation authentication reply, and the authentication keys that are stored in information storage 16 of master device 1 and information storage 26 of slave device 2. That is, the random numbers that are transmitted and received with the encryption key generation authentication request and the authentication keys that have the same value, which are stored in advance in the master device and the slave device respectively, are set to be inputs, and thus the authentication encryption key generation arithmetic operation is carried out and an authentication reply value and an encryption key are calculated in each of master device and slave device. With the encryption key generation authentication reply, slave device 2 transmits only the obtained authentication reply value. If the result of comparing the value of the authentication reply that is received with the encryption key generation authentication reply and the value of the authentication reply that is obtained by master device 1 itself performing the calculation is that the two values are the same, master device 1, as illustrated in FIG. 6, continues to perform communication and starts to activate the encryption communication. If the result is that the two values are different from each other, the communication is discontinued (this is not illustrated).

When the authentication ends and the generation of encryption key CK1 is completed, the activation of the encryption communication starts. In a case where an encryption request (for example, {CIPHER-REQUEST} that is a message of the NWK layer, in the case of the wireless communication in compliance with the DECT scheme) from master device 1, an encryption start request (for example, start encryption: request that is a control message of the MAC layer, in the case of the wireless communication in compliance with the DECT scheme) from slave device 2, an encryption start confirmation (for example, start encryption: confirm that is a control message of the MAC layer, in the case of the wireless communication in compliance with the DECT scheme) from the master device, an encryption start grant (for example, start encryption: grant that is a control message of the MAC layer, in the case of the wireless communication in compliance with the DECT scheme) from slave device 2 are sequentially transmitted and received, and the activation of the encryption communication is completed. On the slave device 2 side, the encryption start request is transmitted, decoding processing of the reception signal is started in the next frame, and when the encryption start confirmation is received, encryption of a transmission signal is started. In master device 1, when the encryption start request is received, the encryption of the transmission signal is started in the next frame, and the decoding processing of the reception signal is started with reception of the next frame in which the encryption start confirmation is transmitted. Master device 1 activates encryption key change timer T1 that measures a time at which timer unit 18 activates the encryption key change phase.

When the activation of the encryption communication is completed, master device 1 transmits connection notification (for example, {CC-CONNECT} that is a message of the NWK layer, in the case of the wireless communication in compliance with the DECT scheme), transmits to slave device 2 a signal that is input from a telephone line, and outputs to the telephone line a signal that is received from slave device 2. Furthermore, when receiving a connection notification, slave device 2 outputs the speaker the signal that is received from master device 1, starts to transmit to master device 1 a signal that is input from the microphone, and proceeds to a state where the call is in progress.

Next, the encryption key change phase is described in detail. When encryption key change timer T1 of timer unit 18 of master device 1 expires, the encryption key change phase is started. When encryption key change timer T1 of timer unit 18 of master device 1 expires, transmission and reception of a message for changing an encryption key are started.

The change of the encryption key is made by transmitting and receiving the encryption key generation authentication request and the encryption key generation authentication reply as is the case with the generation of the encryption key in the call activation phase. Master device 1 transmits to the slave device random numbers that are newly generated with the encryption key generation authentication request. The master device and slave device 2 generate new encryption key CK2 by carrying out an operation (which is hereinafter expressed as an authentication encryption key generation arithmetic operation) that is determined in advance by using these random numbers and the authentication keys that are stored in information storage 16 of master device 1 and information storage 26 of slave device 2.

When the generation of new encryption key CK2 is completed, the encryption communication temporarily stops, and control for changing the encryption key to the new encryption key and resuming the encryption communication is started.

First, the encryption request is transmitted from master device 1, in the same manner as when the encryption communication is activated in the call activation phase.

When receiving the encryption request, slave device 2 transmits an encryption stop request (for example, stop encryption: request that is a control message of the MAC layer, in the case of the wireless communication in compliance with the DECT scheme) for temporarily stopping the encryption communication, stops the decoding for the reception from the next frame, and proceeds to an unencrypted-text reception state (a state where a signal that is not encrypted is received).

When receiving the encryption stop request, master device 1 stops the encryption for the transmission and transmits an encryption stop confirmation (for example, stop encryption: confirm that is a control message of the MAC layer, in the case of the wireless communication in compliance with the DECT scheme), and stops the decoding for the reception from the next frame.

When receiving the encryption stop confirmation, slave device 2 stops the encryption for the transmission, and proceeds to an unencrypted-text transmission and reception state (state in which a signal that is not encrypted is transmitted and received).

When the stopping of the encryption communication is completed, in the same manner as when the encryption communication is activated in the call activation phase, the encryption start request (for example, start encryption: request that is a control message of the MAC layer, in the case of the wireless communication in compliance with the DECT scheme) from slave device 2, the encryption start confirmation (for example, start encryption: confirm that is a control message of the MAC layer, in the case of the wireless communication in compliance with the DECT scheme) from the master device, the encryption start grant (for example, start encryption: grant that is a control message of the MAC layer, in the case of the wireless communication in compliance with the DECT scheme) from slave device 2 are sequentially transmitted and received, the activation of the encryption communication is completed, and the encryption communication is started using new encryption key CK2.

Master device 1 activates encryption key change timer T1 that measures the time at which timer unit 18 activates the encryption key change phase, and master device 1 and slave device 2 return to the state where the call is in progress.

Subsequently, whenever encryption key change timer T1 expires, master device 1 activates a wireless encryption key change phase, and makes a change of the encryption key.

Figure 7:
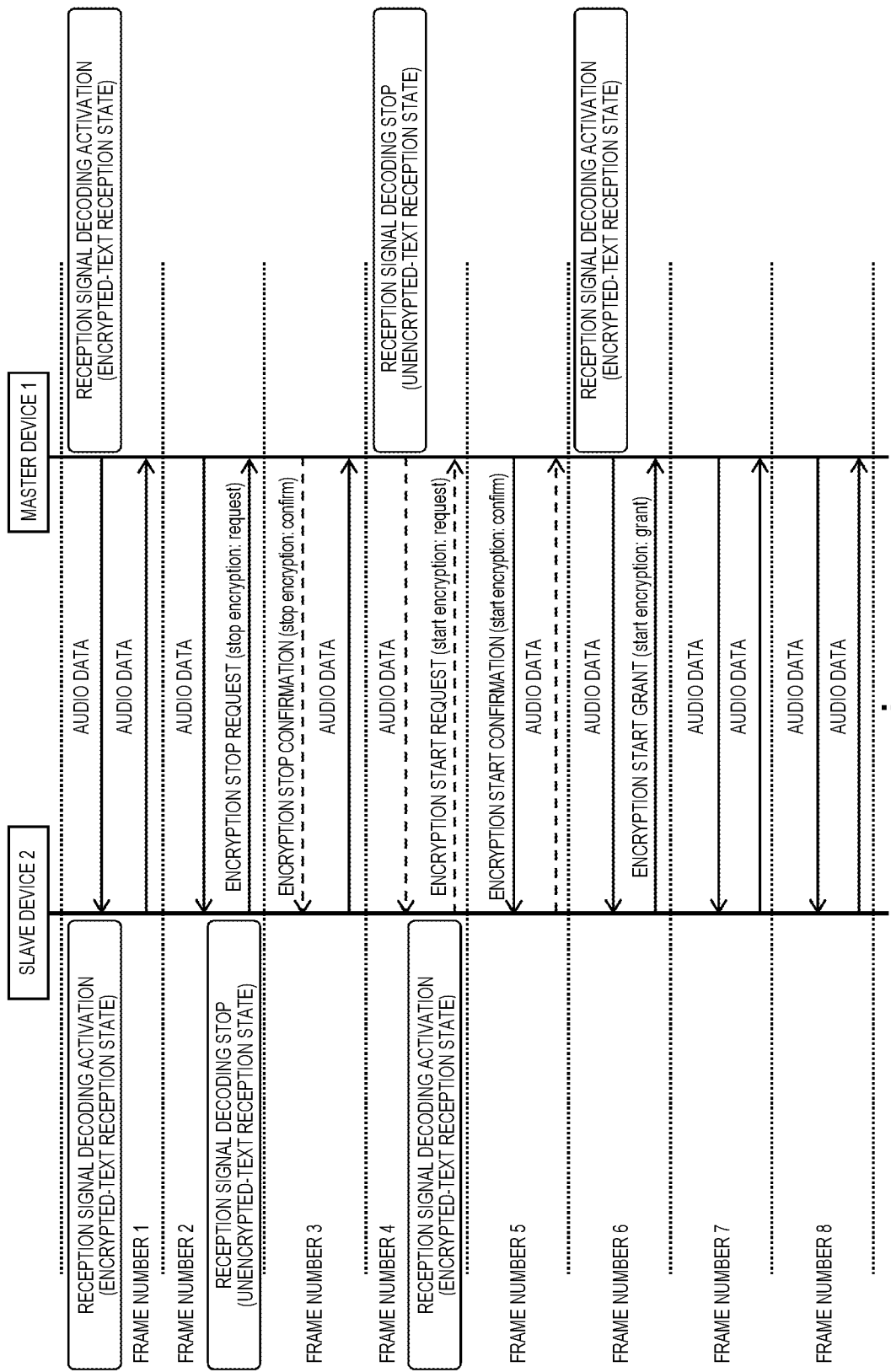
FIG. 7 is a diagram illustrating an example of timings of stopping of encryption, activation and stopping of encryption of a message for activation and a transmission signal, and activation and stopping of decoding of a reception signal in reception processing, according to the first exemplary embodiment of the present invention.

Next, timings of the stopping of the encryption, the activation and stopping of the encryption of the message for the activation and the transmission signal, and the activation and stopping of the decoding of the reception signal in the reception processing, in the wireless encryption key change phase, are described in detail referring to FIG. 7. FIG. 7 is a diagram illustrating an example of the timings of the stopping of the encryption, the activation and stopping of the encryption of the message for the activation and the transmission signal, and the activation and stopping of the decoding of the reception signal in the reception processing.

FIG. 7 illustrates the timings of the stopping of the encryption from when slave device 2 in the encryption key change phase receives the encryption request to when the encryption key is changed and the encryption communication is resumed, and the activation and stopping of the encryption of the message for the activation and the transmission signal, and the activation and stopping of the decoding of the reception signal in the reception processing, which take place in FIG. 6. In FIG. 7, a signal (which is hereinafter expressed as encrypted text) that results from encrypting audio data that is transmitted along with the control message is expressed with a solid-line arrow, and a signal (which is hereinafter expressed as unencrypted text) that is not encrypted is indicated with a dotted-line arrow. Every pair of transmission (a left-headed arrow) from master device 1 to slave device 2 and transmission (a right-headed arrow) from slave device 2 to master device 1 is given a number (which is hereinafter expressed as a frame number) according to a time sequence.

In FIG. 7, in an initial state, that is, a state of being frame number 1, both of master device 1 and slave device 2 transmit encrypted-text audio data, and performs the decoding processing.

In a timing of next frame number 2, slave device 2 transmits the encryption stop request, stops the decoding processing of reception audio data, and proceeds to an unencrypted-text reception state. The transmission by slave device 2 still remains in an encrypted-text transmission state in which the encryption of transmission audio data is performed.

On the other hand, when the encryption stop request is received at the timing of frame number 2, master device 1 stops the encryption of transmission audio data, proceeds to the unencrypted-text transmission state in which the transmission audio data is transmitted without being encrypted, transmits the encryption stop confirmation in the next frame (frame number 3), stops the decoding processing of the reception audio data in the next frame (frame number 4), and proceeds to the unencrypted-text reception state.

When receiving the encryption stop confirmation at the timing of frame number 3, slave device 2 stops the encryption of the transmission audio data at the timing of the next frame (frame number 4), proceeds to the unencrypted-text transmission state in which the transmission audio data is transmitted without being encrypted, and transmits the encryption start request.

When the encryption start request is received at the timing of frame number 4, master device 1 activates the encryption of transmission audio data, proceeds to the encrypted-text transmission state in which the transmission audio data is transmitted being encrypted, transmits the encryption start confirmation in the next frame (frame number 5), starts the decoding processing of the reception audio data in the next frame (frame number 6), and proceeds to the encrypted-text reception state.

When receiving the encryption start confirmation at the timing of frame number 5, slave device 2 activates the encryption of the transmission audio data at the timing of the next frame (frame number 6), proceeds to the encrypted-text transmission state in which the transmission audio data is transmitted being encrypted, and transmits the encryption start grant.

Figure 8:
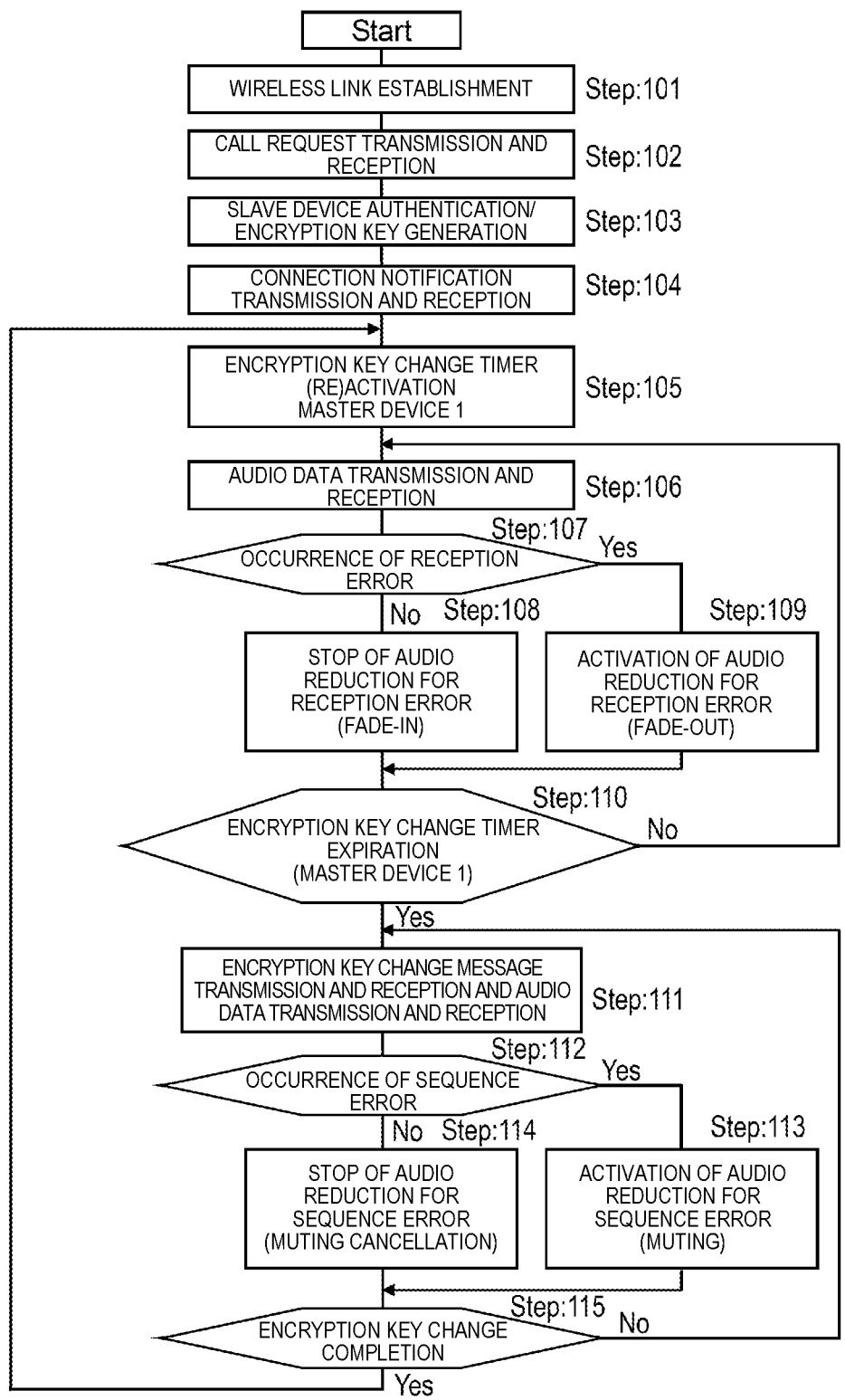
FIG. 8 is a flowchart illustrating an example of operations in which transition from placing a call to the call being in progress takes place and a change of an encryption key is made, which are performed by the master device and the slave device, according to the first exemplary embodiment of the present invention.

Next, an operation when transition from placing a call to the call being in progress takes place and the change of the encryption key is made is described referring to FIG. 8. FIG. 8 is a flowchart illustrating an example of operations in which the transition from placing the call to the call being in progress takes place and the change of the encryption key is made, which are performed by the master device and the slave device.

First, in the call start, wireless link between master device 1 and slave device 2 is established (Step: 101), and a message for the call request is transmitted and received (Step: 102). Slave device authentication is performed, the encryption key for the encryption communication is generated at the same time that the slave device authentication is performed (Step: 103), and the connection notification is transmitted and received (Step: 104).

After the transmission and reception of the connection notification (Step: S104), an encryption key change timer is activated in master device 1 (Step: 105), the communication is in progress, and the transmission and reception of the audio data is performed (Step: 106).

When the transmission and reception of the audio data are performed during the communication (Step: 106), it is determined whether or not a reception error occurs in the audio data (Step: 107). In a case where the reception error does not occur in the received audio data (No in Step: 107), if audio reduction processing for the reception error is stopped, that is, if audio reduction is in progress, fade-in processing is performed (Step: 108). In a case where the reception error occurs in the received audio data (Yes in Step: 107), the audio reduction processing for the reception error is activated and the fade-out processing is performed (Step: 109).

The audio reduction processing in accordance with the reception error is activated (Step: 109) and stopped (Step: 108), and subsequently, a determination of whether or not the encryption key change timer expires (Step: 110) is made in master device 1. In a case where the encryption key change timer does not expire (No in Step: 110), returning to the performing of the transmission and reception of the audio data (Step: 106) takes place, and the processing described above is reiterated.

In a case where the result of determining whether or not the encryption key change timer expires is that the encryption key change timer expires (Yes in Step: 110), proceeding to performing of the transmission and reception of an encryption key change message and the audio data (Step: 111) takes place.

It is determined whether or not, after the transmission and reception of the encryption key change message, an error occurs in a sequence of encryption key change messages, that is, whether or not, after the stopping of the encryption or a message for requesting the activation is transmitted, a response message responding to that message can be received (Step: 112). In a case where it is determined that there is a likelihood that the expected response message will not be able to be received and the stopping of the encryption or a shift from the timing of the activation will occur (Yes in Step: 112), the audio reduction for a sequence error, that is, muting processing is performed, is performed. In a case where the response message can be correctly received and the sequence error does not occur (No in Step: 112), the audio reduction processing for the sequence error, that is, if the muting is in progress, muting cancellation processing, is performed (Step: 114).

The audio reduction processing in accordance with a state of the sequence error is activated (Step: 113) and stopped (Step: 114), and subsequently a determination of whether or not the encryption key change is completed is made (Step: 115). In a case where the encryption key change is not completed (No in Step: 115), returning to the performing of the transmission and reception of the encryption key change message and the transmission and reception of the audio data are performed (Step: 111) takes place, and processing for the encryption key change is reiterated. In a case where the encryption key change is completed (Yes in Step: 115), returning to the (re)activating of the encryption key change timer (Step: 105) takes place, the encryption key change timer is reactivated, returning to the state where the call is in progress, and the operation described above is reiterated.

Because slave device 2 does not have the encryption key change timer, slave device 2 does not perform the (re) activation of the encryption key change timer (Step: 105), does not make the determination of the encryption key change timer (Step: 110) and does not make the determination of the encryption key change (Step: 115). Instead of the determination of the encryption key change timer (Step: 110), in (Step: 110), slave device 2 makes a determination of whether or not a sequence for the encryption key change is activated, that is, of whether or not the encryption key authentication request is received. In a case where the sequence for the encryption key change is activated (Yes in Step: 110), slave device 2 proceeds to performing of the transmission and reception of the encryption key change message and the audio data (Step: 111). In a case where the sequence for the encryption key change is not activated (No in Step: 110), slave device 2 performs an operation of returning to the transmission and reception of the audio data (Step: 106).

The determination of whether or not the reception error occurs in the audio data (Step: 107) or the determination of the occurrence of the sequence error (Step: 112) may be performed with a code for detection of the reception error, which is attached to the audio signal that is received from slave device 2 (or master device 1), except for the determination of occurrence of an error in master device 1 (or slave device 2).

Figure 9:
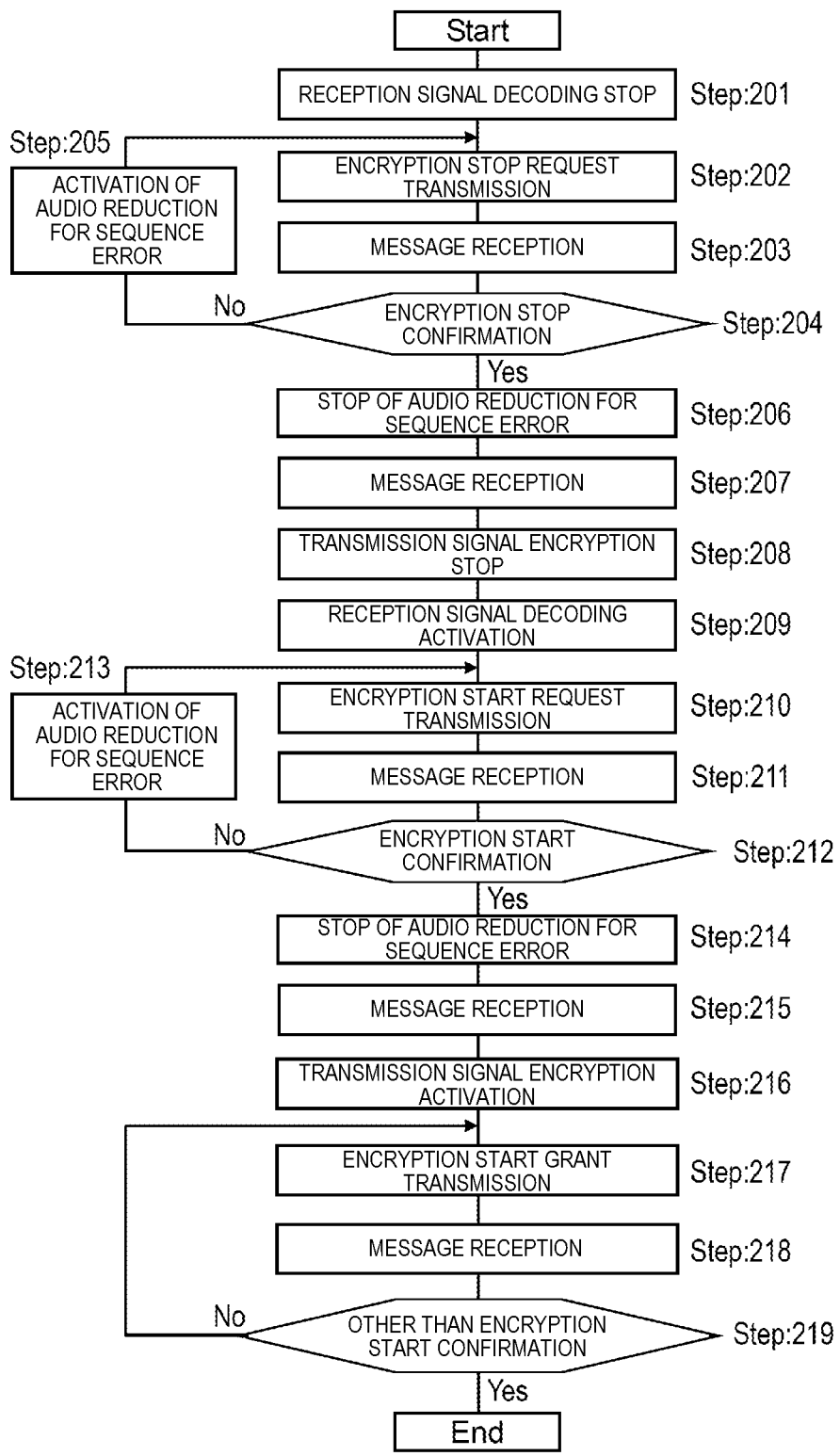
FIG. 9 is a flowchart illustrating an example of operations of making a determination of a sequence error at the time of changing the encryption key and stopping and activating of audio reduction that is based on the determination of the sequence error, which are performed by the slave device which receives an encryption request from the master device and in which a sequence for an encryption key change is activated, according to the first exemplary embodiment of the present invention.

Next, operations when making a determination of the sequence error that occurs at the time of changing the encryption key and when stopping the activation of the audio reduction that is based on the determination of the sequence error, which are performed by the slave device, are described referring to FIG. 9. FIG. 9 is a flowchart illustrating an example of the operations of making the determination of the sequence error at the time of changing the encryption key and stopping the activation of the audio reduction that is based on the determination of the sequence error, which are performed by the slave device which receives the encryption request from the master device and in which a sequence for an encryption key change is activated.

FIG. 9 illustrates the example of the operations of making the determination of the sequence error at the time of changing the encryption key and stopping the activation of the audio reduction that is based on the determination of the sequence error, which subsequently continue to be performed by slave device 2 in which an encryption key change timer of master device 1 expires, generation of a new encryption key is ended, and receives a message for the encryption request from master device 1. In FIG. 9, when the message for the encryption request is received from master device 1, the decoding of the reception signal is stopped (Step: 201) and the encryption stop request is transmitted (Step: 202).

Slave device 2 receives a signal (a message) from master device 1 (Step: 203) and makes the determination of whether or not the received signal is the message for the encryption stop confirmation (Step: 204).

In a case where the received signal is not the message for the encryption stop confirmation, and in a case where the reception error occurs (No in Step: 204), the audio reduction processing (the muting processing) for the sequence error is activated (Step: 205), returning to (Step: 202) takes place, the encryption stop request is transmitted, and an operation of waiting for the encryption stop confirmation is reiterated.

In a case where the received signal is the message for the encryption stop confirmation (Yes in Step: 204), the audio reduction processing for the sequence error is stopped (the muting cancellation processing is performed) (Step: 206), the reception of the audio data and the message (Step: 207) is performed, and the encryption of the transmission signal is stopped (Step: 208).

Subsequently, in order to start the encryption communication with a new encryption key, a decoding operation that uses the new encryption key is started (Step: 209), and the encryption key start request is transmitted (Step: 210).

After the transmission of the encryption key start request, slave device 2 receives a signal (a message) from master device 1 (Step: 211), and makes a determination of whether or not the received signal is the message for the encryption start confirmation (Step: 212).

In a case where the received signal is not the message for the encryption start confirmation, and in a case where the reception error occurs (No in Step: 212), the audio reduction processing (the muting processing) for the sequence error is activated (Step: 213), returning to (Step: 210) takes place, the encryption start request is transmitted, and an operation of waiting for the encryption start confirmation is reiterated.

In the case where the received signal is the message for the encryption stop confirmation (Yes in Step: 212), the audio reduction processing for the sequence error is stopped (the muting cancellation processing is performed) (Step: 214), the reception of the audio data and the message (Step: 215) is performed, and the encryption of the transmission signal is activated (Step: 216).

After activating the encryption of the transmission signal, slave device 2 transmits the encryption start grant (Step: 217), receives the signal (the message) from master device 1 (Step: 218), and makes a determination of whether or not the received signal is the message for the encryption start confirmation (Step: 219).

In a case where the received signal is the message for the encryption start confirmation, and in a case where the reception error occurs (No in Step: 219), returning to Step: 217 takes place, the encryption start grant is transmitted, and an operation of waiting to stop (to receive a message other than the encryption start confirmation) the encryption start confirmation is reiterated.

In a case where the received signal is a message other than the encryption start confirmation (Yes in Step: 219), it is determined that the encryption start grant is correctly received in the master device, and the sequence for the encryption key change is ended.

Figure 10:
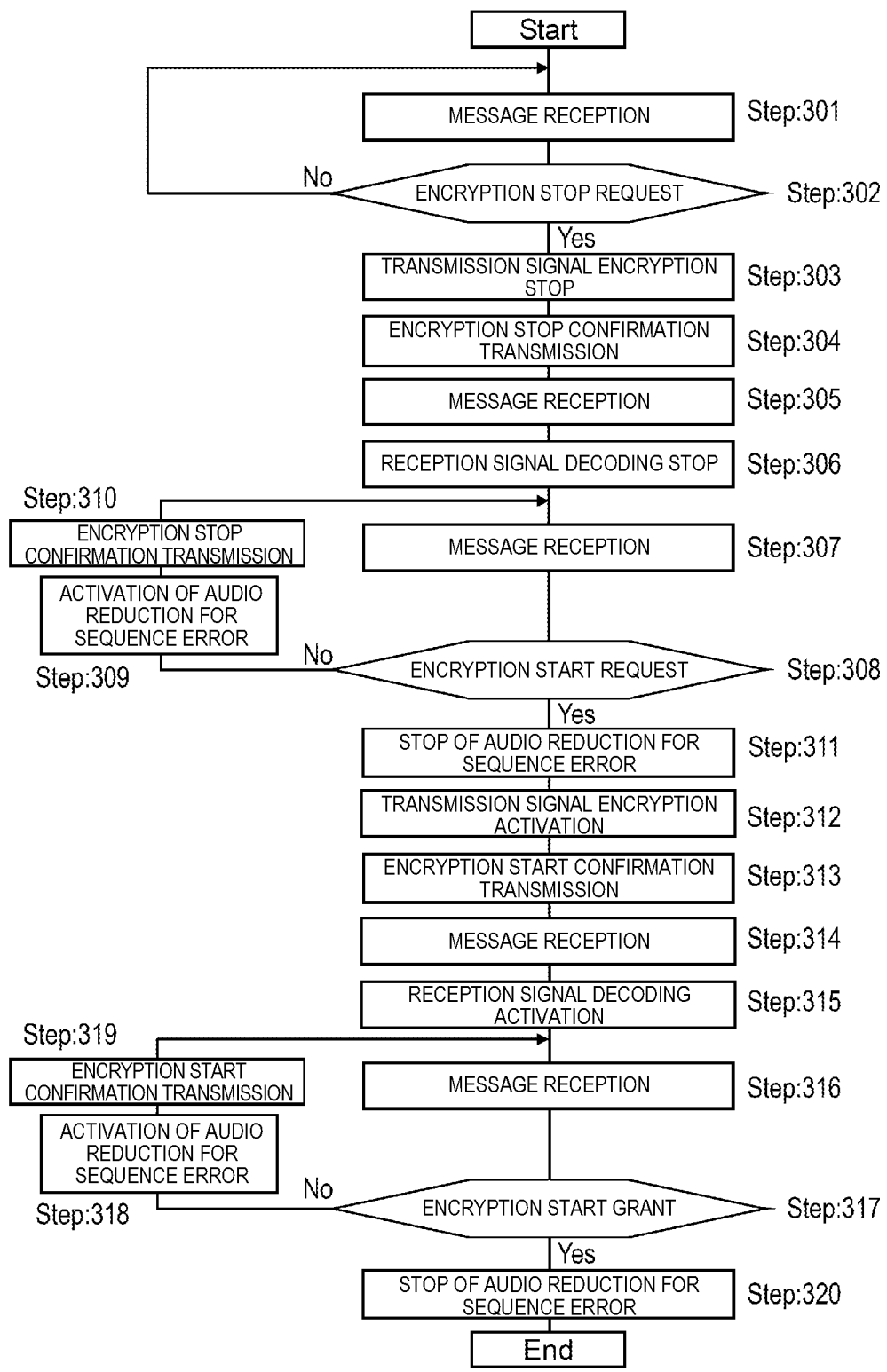
FIG. 10 is a flowchart illustrating an example of the operations of making the determination of the sequence error at the time of changing the encryption key and stopping and activating of the audio reduction that is based on the determination of the sequence error, which are performed by the master device which transmits the encryption request and in which the sequence for the encryption key change is activated, according to the first exemplary embodiment of the present invention.

Next, operations when making a determination of the sequence error that occurs at the time of changing the encryption key and when stopping the activation of the audio reduction that is based on the determination of the sequence error, which are performed by the master device, are described referring to FIG. 10. FIG. 10 illustrates an example of an operation that is performed by master device 1 in which the encryption key change timer expires and which newly generates the encryption key and transmits the message for the encryption request to slave device 2. FIG. 10 is a flowchart illustrating an example of an operation in which the determination of the sequence error at the time of changing the encryption key is made and the activation of the audio reduction that is based on the determination of the sequence error is stopped, which is performed by the master device in which the sequence for the encryption key change is activated.

When transmitting a message for the encryption request to slave device 2, and receiving a message from slave device 2 (Step: 301), master device 1 determines whether or not the message is an encryption stop request (Step: 302).

In a case where the received signal is not the message for the encryption stop request, and in a case where the reception error occurs (No in Step: 302), returning to Step: 301 takes place, and an operation of waiting to receiving the message for the encryption stop request is reiterated.

In a case where the received signal is the encryption stop request (Yes in Step: 302), it is determined that the encryption start grant is correctly received in the master device, and the sequence for the encryption key change is ended. The encryption of the transmission signal is stopped (Step: 303), the encryption stop confirmation is transmitted (Step: 304), and after a message is received (Step: 305), the decoding of the reception signal is stopped (Step: 306).

After the decoding of the reception signal is stopped (Step: 306), a signal (a message) is received from slave device 2 (Step: 307), and it is determined whether or not the received signal is the message for the encryption start request (Step: 308).

In a case where the received signal is not the message for the encryption start request, and in a case where the reception error occurs (No in Step: 308), the audio reduction processing (the muting processing) for the sequence error is activated (Step: 309), the encryption stop confirmation is transmitted (Step: 310), returning to the reception of the message (Step: 307) takes place, and an operation of waiting for the encryption start request is reiterated.

In a case where the received signal is the message for the encryption start request (Yes in Step: 308), the audio reduction processing for the sequence error is stopped (the muting cancellation processing is performed) (Step: 311), the encryption of the transmission signal is activated in such a manner that the encryption is performed with a new encryption key (Step: 312), the encryption start confirmation is transmitted (Step: 313), and after the message is received (Step: 314), the decoding processing that uses a new encryption key for the reception signal is activated (Step: 315).

After the decoding of the reception signal is started (Step: 315), a signal (a message) is received from slave device 2 (Step: 316), and it is determined whether or not the received signal is the message for the encryption start grant (Step: 317).

In a case where the received signal is not the message for the encryption start grant, and in a case where the reception error occurs (No in Step: 317), the audio reduction processing (the muting processing) for the sequence error is activated (Step: 318), the encryption start confirmation is transmitted (Step: 319), returning to the reception of the message (Step: 316) takes place, and an operation of waiting for the encryption start grant is reiterated.

In a case where the received signal is the encryption start grant (Yes in Step: 317), it is determined that the encryption start grant is correctly received in the master device, the audio reduction processing for the sequence error is stopped (the muting cancellation processing is performed) (Step: 320), and the sequence for the encryption key change is ended.

The embodiment of the present invention is described above. As described above, the wireless communications device according to the present invention has an effect in which, in changing the encryption key, at the time of stopping the encryption, in a case where a message that is expected cannot be received in transmitting and receiving a sequence when the encryption is started with a new encryption key, because control is performed in such a manner that audio is reduced, the frequency of occurrence of noise due to the shift from the timings of the stopping of the encryption and the starting of the encryption between the master device and the slave device can be reduced.

The muting processing is performed when the sequence error occurs at the time of changing the encryption key, control is performed when the reception error occurs during the communication in progress in such a manner that the gradual fading-out is performed, and thus it is possible to decrease the frequency of audio interruption due to the sporadically-occurring reception error in a call state other than at the time of changing the encryption key while reducing the frequency of the occurrence of noise at the time of changing the encryption key. As a result, an effect that improves call quality is achieved.

INDUSTRIAL APPLICABILITY

The wireless communications device according to the present invention is useful as a wireless communications device, such as a cordless telephone.

REFERENCE MARKS IN THE DRAWINGS

1 MASTER DEVICE
2 SLAVE DEVICE
3 SLAVE DEVICE
10, 20 WIRELESS COMMUNICATOR
12, 22 AUDIO PROCESSOR
13, 23 INFORMATION REPORTING UNIT
14, 24 OPERATOR
15, 25 DISPLAY UNIT
16, 26 INFORMATION STORAGE
18 TIMER UNIT
19, 27 CONTROLLER
121, 221 DECODER
122, 222 FIRST AUDIO REDUCTION MEANS
123, 223 SECOND AUDIO REDUCTION MEANS

The invention claimed is:

1. A wireless communications device that is a control station for a slave station and that performs encrypted communications using an encryption key and that changes the encryption key using a sequence of encryption key change messages in a predetermined procedure, during a call, the device comprising:
   a processor; and
   a memory storing a program that, when executed by the processor, causes the wireless communications device to reduce an audio level of audio data until the encryption key is correctly changed in the sequence of encryption key change messages, if the procedure in which the encryption key is changed is not correctly performed due to an error occurring in the sequence of encryption key change messages in the predetermined procedure, in a case where a change of the encryption key is made.

2. The wireless communications device of claim 1, wherein the program, when executed by the processor, causes the wireless communications device to:
   reduce the audio level of the audio data, in a case where a response message in the sequence of encryption key change messages is not received, in the predetermined procedure in which the encryption key is changed.

3. The wireless communications device of claim 1, comprising:
   an audio processor which, in operation, performs control such that the audio level of the audio data is faded out at a predetermined rate in a case where a reception error occurs during communication and such that the audio level of the audio data is faded in at the predetermined rate in a case where the reception error does not occur in a state where the audio level of the audio data is faded out, and performs control such that the audio level of the audio data is muted in a case where a message for an encryption key change is not able to be correctly received and such that the muting of the audio level of the audio data is canceled in a case where the message for the encryption key change is correctly received in a state where the audio level of the audio data is muted.

4. A control method for a wireless communications device that is a control station for a slave station and that performs encrypted communications using an encryption key, the method comprising:
   outputting decoded audio data during a call;
   changing the encryption key using a sequence of encryption key change messages in a predetermined procedure during the outputting of the decoded audio data;
   reducing an audio level of the decoded audio data until the encryption key is correctly changed in the sequence of encryption key change messages in a case where the procedure is not correctly performed due to an error occurring in the sequence of encryption key change messages in the predetermined procedure.

5. A wireless communications device that is a control station for a slave station, the wireless communications device comprising:
- a wireless communicator which, in operation, performs wireless communications with the slave station using an encryption key, wherein the encryption key is changed using a sequence of encryption key change messages in a predetermined procedure;
- a processor; and
- a memory storing a program that, when executed by the processor, causes the wireless communications device to reduce an audio level of audio data until the encryption key is correctly changed in the sequence of encryption key change messages, if the procedure in which the encryption key is changed is not correctly performed due to an error occurring in the sequence of encryption key change messages in the predetermined procedure during a call using the encryption key.

6. The wireless communications device of claim 5,
wherein the program, when executed by the processor, causes the wireless communications device to control the audio level of the audio data based on prescribed information during the call using the encryption key, and
wherein the prescribed information is on the presence or absence of a reception error in an audio signal that is transmitted from the slave station.

7. The wireless communications device of claim 5,
wherein the program, when executed by the processor, causes the wireless communications device to control the audio level of the audio data based on prescribed information during the call using the encryption key, and
wherein the prescribed information is on whether or not a message that is to be transmitted from the salve station in order to change the encryption key is received.

8. The wireless communications device of claim 5,
wherein the program, when executed by the processor, causes the wireless communications device to control the audio level of the audio data based on prescribed information during the call using the encryption key, and
wherein the prescribed information is on a reception state of the slave station, which is attached to an audio signal that is transmitted from the slave station.

9. The wireless communications device of claim 6,
wherein the program, when executed by the processor, causes the wireless communications device, in a case where the reception error occurs, to lower the audio level of the audio data to a degree to which the audio level is faded out, during the communication using the encryption key.

10. The wireless communications device of claim 7,
wherein the program, when executed by the processor, causes the wireless communications device, in a case where the message that has to be transmitted from the slave station is not received, to lower the audio level of the audio data to a degree to which the audio level is muted, during the communication using the encryption key.

\* \* \* \* \*